Dec. 16, 1930.   J. W. SMITH   1,785,685
SPRING SHACKLE
Filed June 9, 1928

John W. Smith INVENTOR
BY
ATTORNEYS

Patented Dec. 16, 1930

1,785,685

UNITED STATES PATENT OFFICE

JOHN W. SMITH, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING SHACKLE

Application filed June 9, 1928. Serial No. 284,188.

My invention relates to an antifriction spring shackle for connecting a vehicle frame and spring.

It is an object of the invention to provide a spring shackle in which no adjustment is necessary or desirable during assembly, and, in general, the object is to generally improve an antifriction spring shackle construction so as to facilitate and cheapen manufacture, assembly, and disassembly of the parts.

Briefly stated, in a preferred form of the invention, I provide shackle links having antifriction bearing raceways thereon, either integral therewith, or formed as separate elements thereon. The raceway portions of said shackles are spaced apart a definite distance by means extending between the shackles adjacent the ends thereof and preferably concentric with the raceways thereon. Tubular means having antifriction bearing member raceways thereon, either integral therewith or formed as separate elements carried thereby, are provided, and are adapted to be secured to a vehicle frame and spring. Antifriction bearing members are interposed between the raceways on said tubular means and on said shackle links.

In the drawings which show, for illustrative purposes only, preferred forms of the invention—

Figure 1:
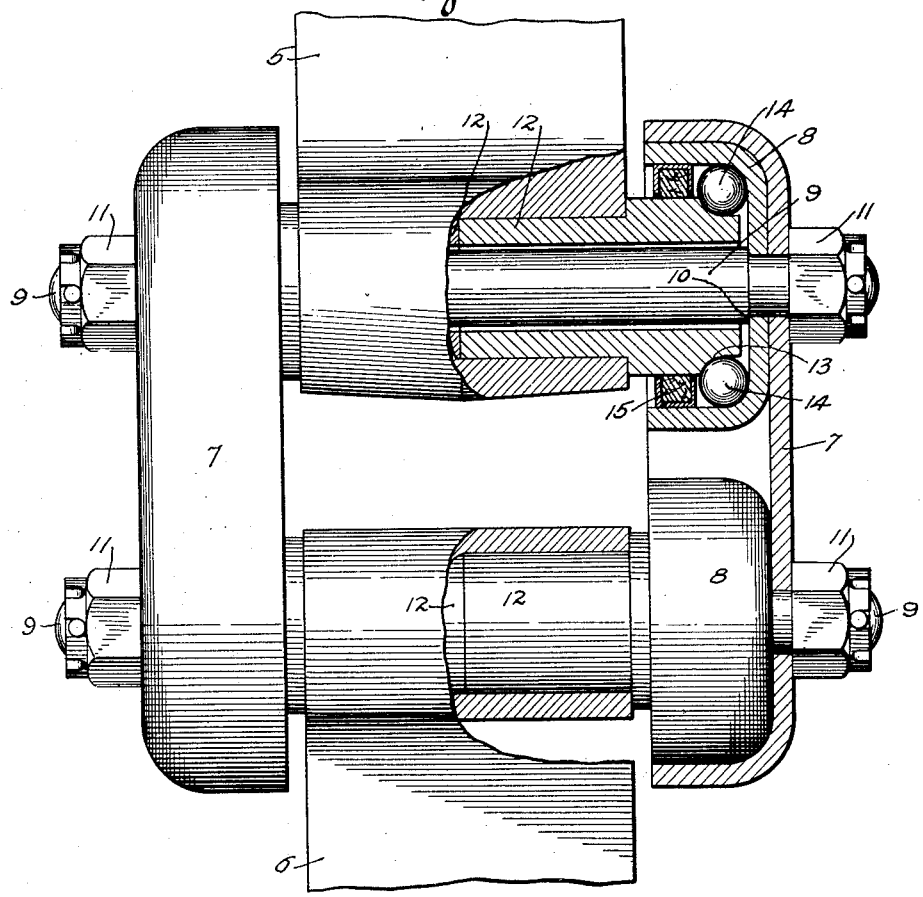
Fig. 1 is a fragmentary end view of a spring and frame connected by means of an improved spring shackle construction, parts being shown in section the better to illustrate the invention.

In said drawings, 5 indicates a portion of a vehicle frame, while 6 indicates a vehicle spring to be connected to the frame by means of a shackle. As shown in Fig. 1, shackle links 7—7 which are preferably duplicates of each other, and which may be either forgings or stampings, are provided with antifriction bearing member raceways at or adjacent the opposite ends thereof. In the form shown, the antifriction bearing member raceways are formed as separate rings or cups 8—8, though my invention is not dependent upon whether the raceways are formed directly in the links or as separate elements thereon. Since both shackle links are preferably duplicates of each other, and since the opposite ends of each link are preferably duplicates, the description of a single end will suffice for all.

The opposed raceway means of opposite links are spaced apart a definite distance, and this spacing is independent of the anti-friction bearing members to be hereinafter mentioned. In the form shown, I employ a means, such as a through bolt 9 having a shoulder 10 at each end thereof, which abuts the shackle links 7—7, or, in the particular form shown in Fig. 1, the bearing cups 8—8 held on the shackle links. The ends 10 of the through bolt 9 preferably extend through apertures in the links, and are provided with nuts 11—11. When the nuts 11 are screwed on tightly, the shackle links 7—7 will be securely held together, and the bearing raceways on the shackle links will be spaced apart definite distances by means of the shoulders, such as 10, on the through bolt.

The frame and spring carry means having antifriction bearing member raceways complementary to those of the shackle links. In the form shown in Fig. 1, I employ separate tubular members 12—12, which may and preferably do abut each other within the frame so as to definitely determine the distance between the antifriction bearing member raceway 13 on one sleeve 12 and that of the corresponding sleeve 12 at the opposite side of the frame. If the tubular members 12—12 abut each other within the frame, the spacing of the bearing raceways or seats 13 will be definitely determined independently of the width or thickness of the frame 5. Antifriction bearing members such as rollers or balls 14 are interposed between the raceways on the tubular bearing means and those of the shackle links. It is desirable to have the tubular bearing sleeves 12—12 rigidly secured in the frame 5, or have shoulders abut the side of the frame, as shown particularly in Fig. 1. In any event, the important thing to be accomplished is the spacing of the bearing seats 13 at a definite distance apart. Obviously the raceways carried by the spring and frame could be on unitary pins rather than on two-part pins as illustrated. The spring 6 is connected to the opposite ends of the shackle links 7—7 by means which may be and preferably are duplicates of those heretofore described in connection with the frame, and no specific description of such duplicate parts need be made.

It is to be noted that the through bolts 9 are loose within the bearing sleeves 12—12, so that during use the frame and spring will be connected and supported from each other by means of the balls 14 and independently of the through bolts 9. Suitable dust rings 15 may be provided for excluding dust from and retaining lubricant on the bearings.

Figure 2:
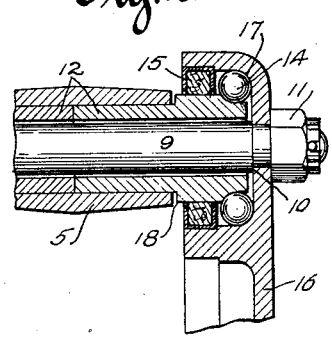
Figs. 2, 3 and 4 show fragmentary views of slightly modified forms.
Figure 3:
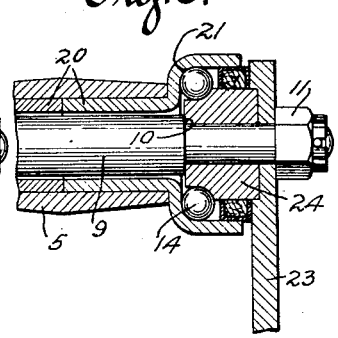
Figure 4:
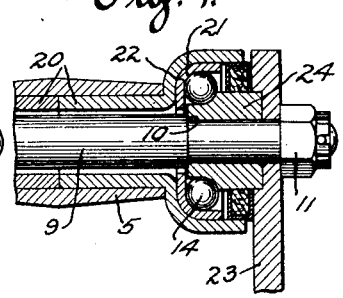

In those forms shown in Figs. 2, 3, and 4, only a part of one shackle link and its connections to one part of a frame have been illustrated, but it is to be understood that in a complete shackle an arrangement preferably a duplicate of those shown in these figures will be provided at the opposite side of the frame and at opposite sides of the spring, in general, similar to the construction of Fig. 1.

In that form shown in Fig. 2, the shackle link 16 is provided at each end with an antifriction bearing member raceway 17, which in this modification is formed directly on the link and not as a separate element as illustrated in Fig. 1. As stated, however, the invention is not dependent upon whether the raceways are formed directly in the shackle links as shown in Fig. 2, or formed as separate elements, as shown in Fig. 1. The through bolt 9 is provided, as heretofore described, with a shoulder 10 which serves to definitely space the links 16 from its corresponding link (not shown). The remainder of the construction illustrated in Fig. 2 may be substantially the same as that heretofore described in connection with Fig. 1. In Fig. 2 it is to be noted that the tubular or sleeve bearing members 12—12 abut each other within the frame 5, and the shoulders 18 on these bearing members do not abut the sides of the frame. The distance between the bearing members at opposite ends of the tubular bearing members is determined by the length of the tubular sleeves, and as has been heretofore described, such distance is independent of the width of the frame.

In those forms shown in Figs. 1 and 2, the outer races for the antifriction bearing members are on the shackle links and the inner raceways are carried by the spring and frame. In those forms shown in Figs. 3 and 4, the outer raceways are carried by the frame and spring, while the inner raceways are carried by the shackle links. In the forms shown in Figs. 3 and 4, the outer races are on tubular sleeves 20—20, which may abut each other within the spring and frame, so as to definitely space apart the bearing seats 21 on the sleeves which abut each other. This distance may be and preferably is independent of the frame or spring width as heretofore indicated. In Fig. 3, the race 21 is formed directly on the sleeve 20, while in Fig. 4 the raceway is formed in a separate cup 22 on the sleeve 20. The inner raceways of the forms shown in Figs. 3 and 4 are on the shackle links 23—23, and if desired may be on bearing blocks 24—24 fitting on said links 23—23. Through bolts 9 are provided with shoulders 10 as heretofore described, and serve to space the inner bearing raceways of the shackle links a definite distance apart. The other features of construction may be substantially the same as those heretofore described.

It is to be noted that with all forms of the invention the antifriction bearing member raceways of the shackle links are spaced a definite distance apart, that is to say, are substantially non-adjustable, and this definite spacing is independent of the antifriction bearing members such as the balls. The raceways of the spring and frame are also spaced a definite distance apart, and this spacing is independent of the antifriction bearing members, and also preferably independent of the particular width of the spring and frame, though, of course, if the spring and frame are of just the desired width, additional support for the bearing raceways may be provided. When the nut or nuts as 11 are screwed home, the complementary raceways of each bearing will be just the desired distance apart to accommodate the balls or other antifriction devices with just the desired tightness. It is to be observed that by properly spacing the shoulders 10 on the through bolts or other spacing means, the bearing raceways carried by the shackle links will be definitely spaced. The tubular bearing means carried by the spring and frame may be and preferably are definitely spaced, and the distance between the raceways definitely determined independently of the spring and frame widths. Thus, all parts are freely interchangeable, and quantity production of my improved shackle is facilitated. During assembly the nuts 11—11 are screwed home and with properly made parts the fit is just that desired. Therefore nothing depends upon the skill or judgment of the assembling mechanic.

While the invention has been described in considerable detail and some alternate forms illustrated, it is to be understood that many other changes and modifications may be made within the scope of the invention as defined in the appended claims.

I claim:

1. In an antifriction spring shackle, a pair of shackle links having antifriction raceways at opposite ends thereof, means at opposite ends of said links for connecting said links together and definitely spacing the same apart at definite distances, means having antifriction raceways complementary to the raceways on said shackle links and antifriction bearing members interposed between the raceways on said means and on said shackle links.

2. In an antifriction spring shackle, shackle links having antifriction bearing member raceways at the ends thereof, means extending through said shackles substantially concentric with said raceways for holding said links together and spacing the same apart at definite distances, means having antifriction bearing member raceways complementary to the raceways of said shackle links and antifriction bearing members interposed between the raceways on said means and on said shackle links.

3. In an antifriction spring shackle, a pair of shackle links, each having spaced apart antifriction bearing member raceways thereon, means extending through said shackle links substantially concentric with each of said raceways for holding said links together and spacing the same apart a definite distance, means having antifriction bearing member raceways complementary to said raceways on said shackle links, and antifriction bearing members interposed between the raceways on said means and on said shackle links.

4. In an antifriction spring shackle, a pair of shackle links, each having spaced apart antifriction bearing member raceways thereon, means engaging said links adjacent each of the raceways thereon for holding said links together and spacing the same apart a definite distance, means having antifriction bearing member raceways complementary to the raceways on said shackle links, and antifriction bearing members interposed between the raceways on said means and on said links.

5. In an antifriction spring shackle, a pair of links having antifriction bearing member raceways at opposite ends thereof, a pair of shouldered through bolts for connecting said links together and spacing the same apart a definite distance, means surrounding said through bolts and having antifriction bearing member raceways complementary to those of said shackle links, and antifriction bearing members interposed between the raceways of said means and said shackle links.

6. In an antifriction spring shackle, a pair of shackle links having antifriction bearing member raceways thereon, means comprising a through bolt having integral shoulders thereon and nuts threaded on the ends thereof for holding said shackle links together and definitely spacing the same apart a definite distance, means having antifriction bearing member raceways complementary to the raceways of said shackle links, and antifriction bearing members interposed between the raceways of said last mentioned means and said links.

7. In an antifriction spring shackle, shackle links having antifriction bearing member raceways thereon adjacent opposite ends thereof, means comprising a through bolt having integral shoulders thereon and nuts threaded on the ends thereof for spacing the bearing raceways a definite distance apart, means having antifriction bearing member raceways complementary to those of said shackle links, and antifriction bearing members interposed between the raceways on said last mentioned means and said links.

8. In an antifriction spring shackle, a pair of shackle links having antifriction bearing member raceways thereon adjacent opposite ends thereof, tubular means extending between said shackle links and having antifriction bearing member raceways complementary to those on said shackle links, antifriction bearing members interposed between the raceways on said tubular means and said shackle links, and means independent of said antifriction bearing members and extending within said tubular means for definitely spacing the raceways of said shackle links apart a definite distance.

9. In an antifriction spring shackle, a pair of shackle links having antifriction bearing member raceways adjacent opposite ends thereof, tubular means to be secured to a frame and having antifriction bearing member raceways thereon complementary to those at one end of said shackles, tubular means to be secured to a spring and having antifriction bearing member raceways thereon complementary to those at the other ends of said links, and through bolts having shoulders thereon and extending through said tubular means for spacing said raceways on said shackle links a definite distance apart, and antifriction bearing members interposed between the raceways of said tubular means and said shackle links.

10. In an antifriction spring shackle, a pair of shackle links having antifriction bearing member raceways adjacent opposite ends thereof, tubular means to be secured to a frame and having raceways complementary to opposed raceways at one end of said shackle links, tubular means to be secured to a spring and having antifriction bearing member raceways complementary to opposed raceways at the other end of said links, through bolts extending through said shackles and having shoulders for definitely spacing the raceway portions of said shackle links a definite distance apart, and means on said through bolts for holding said shackle links together.

11. In an antifriction spring shackle, a pair of shackle links having spaced apart seats thereon, separate antifriction bearing member raceways seated on said seats, shouldered means for holding said raceways on said seats and definitely holding said links and raceways in definitely spaced apart relation, tubular means concentric with said shouldered means to be carried by a frame and a spring, said tubular means having antifriction bearing member raceways thereon, and antifriction bearing members interposed between said last mentioned raceways and said raceways carried by said links.

12. In an antifriction spring shackle, a pair of shackle links having spaced apart seats thereon, bearing cups seated on said seats, through-bolt means having shoulders thereon engaging said cups, means on said through-bolt means for holding said cups and shackle links together, said shoulders engaging said cups for definitely spacing said cups and links apart, tubular members to be carried by a spring and frame and surrounding said through-bolt means, said tubular members having bearing raceways at opposite sides of a spring and frame, and antifriction bearing members interposed between the raceways on said tubular members and said bearing cups.

13. In an antifriction spring shackle construction, a pair of channel-shaped shackle links, spaced apart bearing cups seated in each of said channel links, through-bolt means engaging each of said bearing cups and links for holding the same in definite spaced apart positions, bearing means having antifriction bearing member raceways thereon complementary to raceway surfaces in each of said cups, and antifriction bearing members interposed between each of said cups and complementary raceways on said bearing means.

14. In an antifriction spring shackle, shackle links having spaced-apart antifriction bearing-member raceways thereon, spacing means for spacing the same a definite distance apart, bearing means having antifriction bearing-member raceways complementary to those of said shackle links, and antifriction bearing members interposed between the raceways on said bearing means and on said links, said bearing means each comprising two-part tubular pins to be received in a spring and frame, with said spacing means extending through said two-part tubular pin.

15. In an antifriction spring shackle, tubular pin means to be carried by a frame and having raceways at opposite sides of said frame, tubular pin means to be carried by a spring and having raceways at opposite sides of said spring, shackle links having bearing cups seated thereon, antifriction bearing members interposed between said bearing cups and the raceways on said tubular pin means carried by said spring and said frame, shouldered through-bolts extending through said links and through said tubular pin means for holding said links to each other in definitely spaced apart relation.

16. In an antifriction spring connection, tubular bearing means having antifriction bearing member raceways at the ends thereof, other bearing means having antifriction bearing member raceways complementary to said first mentioned raceways and extending about said first mentioned raceways, antifriction bearing members interposed between said complementary raceways, and spacing and securing means extending through said tubular bearing means for holding said other bearing means in definitely spaced apart relation for the purpose described.

17. In an antifriction spring connection, a pair of opposed bearing cups, spacing and tie means extending between said cups for definitely spacing the same apart and holding the same in spaced relation, tubular means having bearing raceways complementary to raceway surfaces of said cups, antifriction bearing members between said raceways and said cups, said tubular means surrounding said spacing and tie means, and side members secured to said spacing and tie means for the purpose described.

18. In a spring shackle construction, a pair of channel-shaped shackle links having cup receiving seats thereon, cups seated on said seats, antifriction bearing members in said cups, dust rings for said cups for protecting the bearing members therein, tubular pin means to be carried by a spring and by a frame and having antifriction raceways formed directly thereon at the ends, said raceways engaging said antifriction bearing members, a through-bolt extending through each of said tubular pin means, each through-bolt having shoulders thereon engaging opposite cups for spacing the same apart, each through-bolt having ends extending through apertures in said shackle links and having means outside of said links for holding said links to each other with the cups carried by opposite links in definite spaced apart relation.

JOHN W. SMITH.